United States Patent [19]
Robertson et al.

[11] Patent Number: 6,162,125
[45] Date of Patent: Dec. 19, 2000

[54] MOTOR SHAFT TO GEAR PUMP COUPLING DEVICE FOR FLUID BORNE NOISE REDUCTION

[75] Inventors: James Richard Robertson, Walled Lake; Sunil Palakodati, Westland, both of Mich.

[73] Assignee: Ford Global Technologies, Dearborn, Mich.

[21] Appl. No.: 09/294,072

[22] Filed: Apr. 19, 1999

[51] Int. Cl.[7] .................................................. F16D 3/76
[52] U.S. Cl. .......................... 464/89; 464/87; 464/106; 403/300; 417/423.6
[58] Field of Search ........................ 464/89, 87, 106; 403/300, 308, 286, 347; 417/423.6

[56] References Cited

U.S. PATENT DOCUMENTS

| | | |
|---|---|---|
| 2,291,346 | 7/1942 | Robinson . |
| 3,431,751 | 3/1969 | Stokely ........................................ 464/8 |
| 3,451,228 | 6/1969 | Henley ....................................... 464/89 |
| 3,936,238 | 2/1976 | Wycliffe . |
| 4,002,029 | 1/1977 | Jones . |
| 4,286,442 | 9/1981 | Peterson . |
| 4,452,592 | 6/1984 | Tsai . |
| 4,500,270 | 2/1985 | Tuckey . |
| 4,978,282 | 12/1990 | Fu . |
| 5,006,048 | 4/1991 | Jow . |
| 5,127,316 | 7/1992 | Ishiwata ....................................... 92/72 |
| 5,393,203 | 2/1995 | Hantle ....................................... 417/203 |
| 5,407,334 | 4/1995 | Sano et al. ............................... 418/55.1 |

*Primary Examiner*—Lynne H. Browne
*Assistant Examiner*—Aaron M Dunwoody
*Attorney, Agent, or Firm*—Gregory P. Brown

[57] ABSTRACT

An electro-hydraulic gear pump power pack [10], including a gear pump [12] and a motor [16], are secured together to form a single assembly. The gear pump [12] has a gear drive [14] that is in rotational communication with a drive shaft [18] extending from the motor [16]. An insert coupling device [20] is constructed of a plastic material and is slip fit onto the drive shaft [18] to dampen vibrations and fluctuations between the shafts [14, 18] and thereby minimize fluid borne noise in the pump [12].

15 Claims, 1 Drawing Sheet

6,162,125

MOTOR SHAFT TO GEAR PUMP COUPLING DEVICE FOR FLUID BORNE NOISE REDUCTION

TECHNICAL FIELD

The present invention relates generally to hydraulic pumps. More particularly, the present invention relates to a device for coupling a motor shaft to a hydraulic pump drive gear that minimizes fluid borne noise in the hydraulic pump.

BACKGROUND ART

The use of hydraulic pumps, such as power steering pumps, is well known in the automotive industry. Conventional hydraulic pumps, such as those used in power steering systems, are typically positive displacement pumps. Positive displacement pumps, such as gear pumps, have a pumping action that creates a pressure fluctuation in the pump discharge flow. Any variations in this pump discharge flow are converted to pressure pulsation when they encounter circuit resistance. This conversion is referred to in the art as a pressure ripple.

The pressure pulsations transmitted through the fluid can cause resonating of the system components downstream of the pump, which is known in the art as fluid borne noise. This pressure fluctuation or pulsation can also excite structures in the pumping circuit causing them to vibrate and generate additional objectionable noise.

Positive displacement pumps are typically driven by motors having motor shafts or drive shafts. Motor shafts are known to have fluctuations that are transmitted to the hydraulic or gear pump by direct coupling of the shaft to the hydraulic pump. These fluctuations further amplify the pressure pulsations transmitted through the fluid, thus increasing the objectionable fluid borne noise.

Other known couplings have been utilized between motor shafts and gear pumps, but most suffer from a variety of problems, including misalignment when driving one shaft to another. Additionally, these prior coupling devices are relatively expensive. It would therefore be desirable to provide an apparatus for coupling a motor shaft to a drive gear of a hydraulic pump for use in a power steering system that is able to minimize the amount of fluid borne noise attributable to the direct coupling and that is also inexpensive.

SUMMARY OF THE INVENTION

It is therefore an object of the present invention to provide a device for coupling a motor shaft to a hydraulic power steering pump drive gear that reduces fluid borne noise in a power steering system.

It is a further object of the present invention to provide a coupling device for an electro-hydraulic gear pump power pack that accommodates for misalignment of the shafts, dampens vibrations, torque fluctuations, and shock loads.

In accordance with the objects of the present invention an electro-hydraulic pump power pack is provided. The pump power pack includes a motor, having a rotatable drive shaft, and a pump having a gear drive in rotatable communication with the drive shaft. An insert coupling is located at the junction between the drive shaft and the gear drive in order to couple rotation between them. The insert coupling is disposed on either the drive shaft or the gear drive and has a receptacle for receiving either the drive shaft or the gear drive therein to allow for the transmission of torque between the shafts. The utilization of the insert coupling helps minimize fluid borne noise in the gear pump.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
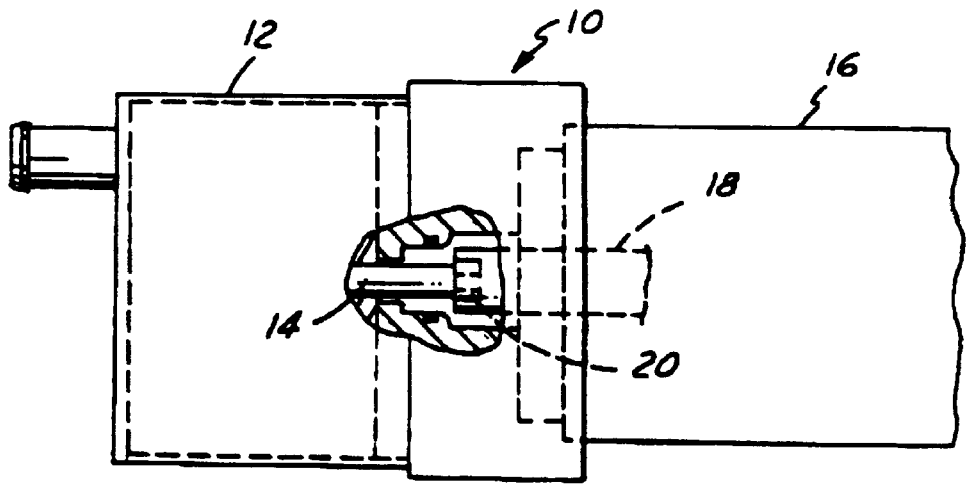
FIG. 1 is a schematic side view partially broken away of an electro-hydraulic pump power pack in accordance with a preferred embodiment of the present invention.
Figure 2:
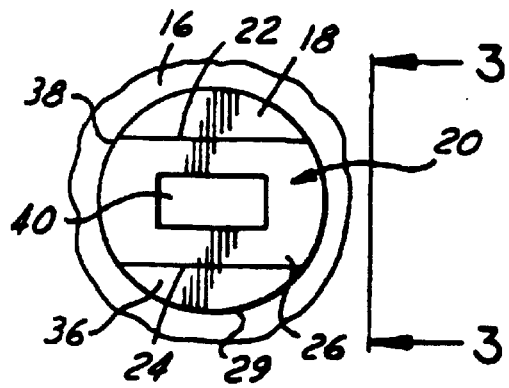
FIG. 2 is an end view of an insert for coupling a motor shaft to a pump drive gear in accordance with a preferred embodiment of the present invention.
Figure 3:
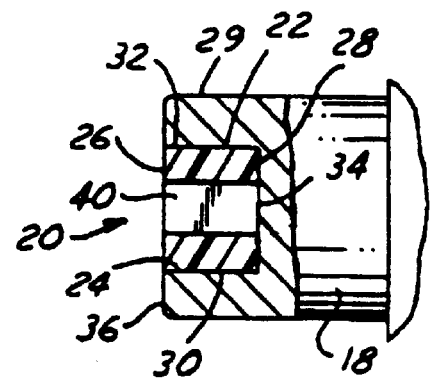
FIG. 3 is a cross-sectional view of the coupling insert of FIG. 2 along the line 3—3.
Figure 4:
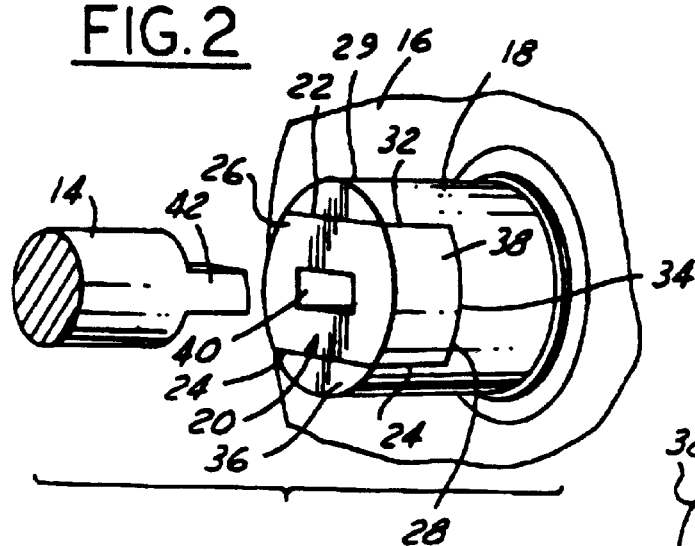
FIG. 4 is a schematic illustration of the connection between a pump drive gear and an insert coupling positioned in a motor shaft in accordance with a preferred embodiment of the present invention.
Figure 5:
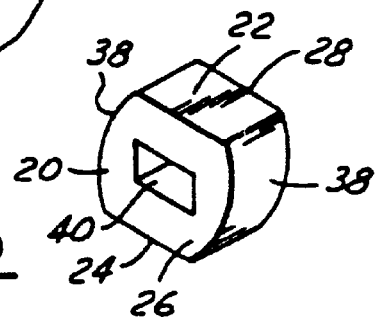
FIG. 5 is a perspective view of an insert coupling in accordance with a preferred embodiment of the present invention.

Referring now to FIG. 1, which is a schematic illustration partially broken away of an electro-hydraulic gear pump power pack 10 in accordance with the present invention. The power pack 10 includes a hydraulic pump or gear pump 12, having a drive gear 14, and a motor 16 having a motor shaft 18 in rotational communication with the drive gear 14. The pump 12 is preferably mounted to the motor 16 by a mounting apparatus such as a bracket or the like (not shown). The hydraulic pump 12 is preferably a positive displacement pump, such as a gear pump or a vane pump, however any other positive displacement pump may be utilized. The disclosed hydraulic pump 10 is preferably for use in a vehicle power steering system, but may be utilized in a variety of other systems, including non-automotive applications. The disclosed motor 16 may be a commercially available DC motor.

As shown in FIGS. 1 through 5, an insert coupling 20 is disposed at the junction of the drive shaft 18 and the gear drive 14. The insert coupling 20 is preferably slip fit to the motor drive shaft 18. In the preferred embodiment, a slot or other hole is bored or otherwise formed in the drive shaft 18 and the insert coupling 20 is positioned therein. The insert coupling 20 is thus supported within the drive shaft bore, by the surrounding drive shaft 18, as is discussed in more detail below. The insert coupling 20 is preferably slip fit into the drive shaft bore. The drive shaft 18 is preferably made from steel and the insert coupling 20 is preferably made from a plastic material. Obviously, the insert coupling 20 may be constructed of any polymeric material that has sufficient strength and durability to achieve the objects of the present invention.

The insert coupling 20 may take on a variety of different shapes and configurations. The preferred shape, however, is illustrated in the drawings. The insert coupling 20, preferably has an upper surface 22, a lower surface 24, a front surface 26, and a rear surface 28. The upper surface 22 and the lower surface 24 are disposed generally parallel to each other and extend from the front surface 26 to the rear surface 28. The upper surface 22 and the lower surface 24 contact a respective upper surface 32 and lower surface 30 of the drive shaft bore. The front surface 26 and the rear surface 28 are preferably disposed generally parallel to one another with the rear surface 28 in contact with an end surface 34 of the bore. The front surface 26 is preferably flush with the front face 36 of the drive shaft 18. It should be understood, however, that the front surface 26 may be recessed with respect to the front face 36 or may extend beyond the front face 36.

The insert coupling 20 has a pair of opposing side surfaces 38. Each of the side surfaces 38 extends between the upper surface 22 and the lower surface 24 and is generally accurate in shape. The side surfaces 28 preferably are shaped to match the outer periphery 29 of drive shaft 18. The insert coupling 20 is thus supported on its upper surface 22, its lower surface 24, and its rear surface 28 by the steel of the motor shaft 18. Specifically, the insert coupling 20 is supported by the upper bore surface 32, the lower bore surface 30, and the end bore surface 34. However, it should be understood that the insert coupling 20 may be supported on more or less surfaces. A receptacle 40 is formed through the front surface 26 of the insert coupling. The receptacle 40 is preferably rectangular in shape to match and receive therein a rectangular extension 42 formed on the end of the drive gear 12.

The mating relationship of the extension 42 and the receptacle 40, together with the support of the insert coupling 20 within the drive shaft bore, allows the motor shaft 18 to transmit higher torque than a coupling made only of plastic. A coupling of this type of configuration not only transmits torque from the motor 16 to the pump 12, but also accommodates misalignment between the shafts 14 and 18 and dampens vibrations, torque fluctuations, and shock loads. This allows for minimization of fluid borne noise in the pump 12 as well as the power steering system into which the pump 12 is preferably incorporated. Because the insert coupling 20 is preferably made from a plastic material, it is inexpensive to manufacture, particularly in large quantities.

While the insert coupling 20 is preferably slip fit into the drive shaft 18 with an extension 42 formed on the gear shaft. It will be appreciated that the extension may alternatively be formed on the drive shaft 18 with the insert coupling slip fit into a bore or slot formed in the gear shaft 14. Further, the shape of the receptacle 40 may vary as may the shape of the extension. Moreover, the insert coupling may be attached to the drive shaft 18 by a variety of known methods instead of by slip fitting.

While particular embodiments of the invention have been shown and described, numerous variations and alternate embodiments will occur to those skilled in the art. Accordingly, it is intended that the invention be limited only in terms of the appended claims.

What is claimed is:

1. An electro hydraulic pump power pack comprising:
    a motor having a rotatable drive shaft extending therefrom, said drive shaft having a generally circular outer periphery;
    a pump having a rotatable pump drive in communication with said drive shaft at a junction;
    a polymeric coupling positioned at said junction and supported by one of said drive shaft or said pump drive wherein said drive shaft has a bore formed therein for receipt of said coupling; and
    a receptacle formed in said coupling for receipt of one of said drive shaft or said pump drive to allow transmission of torque from said motor to said pump.

2. The pump power pack as recited in claim 1, wherein said insert coupling has a top surface, a bottom surface, a front face, a rear surface, and a pair opposing side surfaces.

3. The pump power pack as recited in claim 2, wherein said insert coupling is supported in said bore at said top surface, said bottom surface, and said rear surface.

4. The pump power pack as recited in claim 3, wherein said pair of opposing side surfaces are arcuate and have a radius of curvature that matches a radius of curvature of said drive shaft outer periphery.

5. The pump power pack as recited in claim 4, wherein said insert coupling is supported in said bore at said top surface, said bottom surface, said rear surface, and said opposing side surfaces.

6. The pump power pack as recited in claim 4, wherein said coupling is constructed of a plastic material.

7. The pump power pack as recited in claim 1, wherein said pump drive has an extension formed thereon that is shaped to fit within said receptacle.

8. The pump power pack as recited in claim 7, wherein said receptacle is non-circular in shape.

9. An insert coupling constructed of a polymeric material for allowing the transmission of torque from a motor drive shaft to a pump drive gear, comprising:
    a rear face for communication with a slot formed in said drive shaft;
    a front face disposed generally parallel to said rear face;
    a top surface extending between said rear face and said front face, a substantial portion of said top surface in contact with an inner surface of said slot;
    a pair of opposing side surfaces each bounded by said front face, said rear face, said top surface, and said bottom surface, wherein said pair of opposing side surfaces are arcuate in shape and have a periphery that matches a periphery of said drive shaft;
    a receptacle formed in said front face sized for communication with said pump drive gear;
    said coupling being positioned within said slot in said drive shaft.

10. The insert coupling as recited in claim 9, wherein said pump drive gear has an extension thereon that is sized to mate with said receptacle to allow transmission of torque therebetween.

11. The insert coupling as recited in claim 10, wherein said receptacle is non-circular in shape.

12. The insert coupling as recited in claim 10, wherein said receptacle is rectangular in shape.

13. An electro-hydraulic pump power pack for a power steering system comprising:
    a motor having a rotatable drive shaft extending therefrom;
    a positive displacement pump having a rotatable pump shaft for communication with said drive shaft at a junction, said pump shaft having an engaging portion positioned thereon;
    a polymeric coupling positioned at said junction on said drive shaft and disposed in a bore formed in said drive shaft;
    a receptacle formed in said coupling for receipt of said pump shaft engaging portion to allow transmission of torque from said motor to said positive displacement pump.

14. The power pack as recited in claim 13, wherein said insert coupling has a top surface, a bottom surface, a front face, a rear surface, and a pair of opposing side surfaces.

15. The power pack as recited in claim 14, wherein said coupling is supported in said bore at said top surface, said bottom surface, and said rear surface.

* * * * *